Oct. 31, 1939.   J. P. HEAGNEY   2,178,422
AIR-SPEED INDICATOR
Filed March 28, 1938
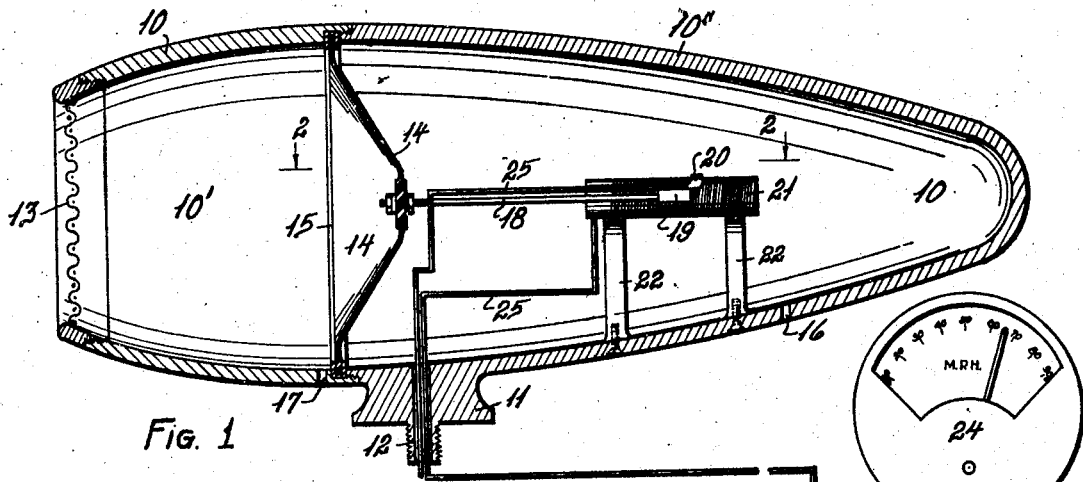
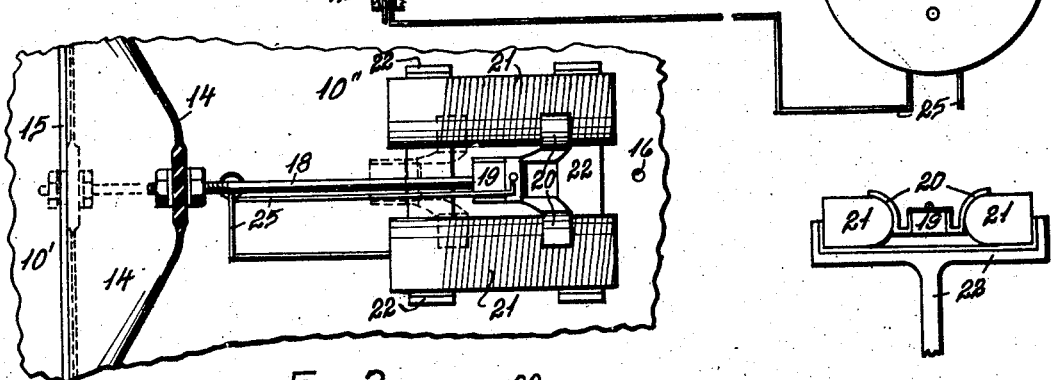
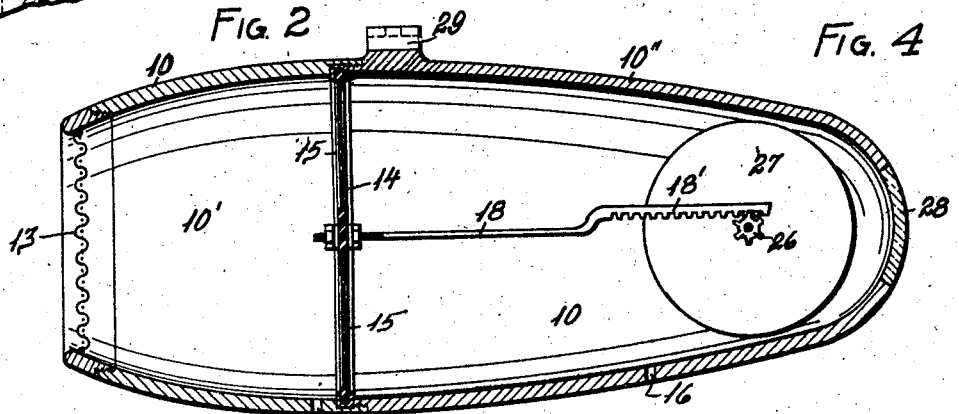
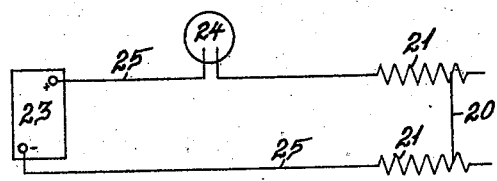
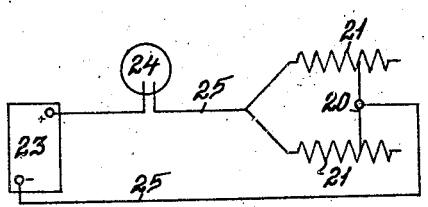
Inventor:
JOSEPH P. HEAGNEY
By  *Howard J. Sweet*
Attorney Patented Oct. 31, 1939

2,178,422

UNITED STATES PATENT OFFICE 2,178,422

AIR-SPEED INDICATOR

Joseph P. Heagney, Denver, Colo.

Application March 28, 1938, Serial No. 198,549

6 Claims. (Cl. 73—2)

This invention relates to apparatus responsive to variations in air pressure and arranged to indicate such variations in terms of relative air speed, and has as an object to provide an improved arrangement and assembly of elements constituting an air-speed measuring and indicating device.

A further object of the invention is to provide an improved construction and arrangement of pressure-responsive means disposable in an air stream to measure relative air velocity and to indicate such velocity in terms of speed at a remote point.

A further object of the invention is to provide improved air-speed measuring and indicating apparatus particularly adapted for use with automotive vehicles, and the like.

A further object of the invention is to provide an improved construction and arrangement of a pressure-responsive element in air-speed indicating apparatus.

A further object of the invention is to provide improved means in air-speed measuring and indicating apparatus whereby pressure variations acting upon a movable element are translated into terms of air speed.

A further object of the invention is to provide air-speed measuring and indicating apparatus which is simple and inexpensive of manufacture and installation; which is positive and efficient in fully automatic operation; which is readily adaptable to various specific installations and associations for the determination of relative air speed; and which is susceptible of convenient maintenance and adjustment.

My invention consists in the construction, arrangement, and combination of elements hereinafter set forth, pointed out in my claims, and illustrated by the accompanying drawing, in which—

Figure 1 is a vertical section axially of a preferred embodiment of pressure-responsive means incorporating the principles of the invention, wherewith is associated conventional indicating means. Figure 2 is a fragmentary, detail section, on an enlarged scale, taken on the indicated line 2—2 of Figure 1. Figure 3 is a section similar to Figure 1 illustrating a modified construction of associated pressure-responsive and indicating means. Figure 4 is an end elevation of the pressure-measuring means shown in Figure 2. Figure 5 is a conventionalized diagram of electrical connections and means wherethrough the preferred embodiment of the invention is rendered operative. Figure 6 is a conventionalized diagram of an alternative electrical circuit employable with the invention.

In the construction of the improvement as shown, a pressure head including the pressure-responsive and pressure-measuring elements of the apparatus is shown as comprising a suitably-contoured, hollow, shell or casing assembly 10, preferably symmetrical about its longitudinal axis, circular in cross section, and formed in any suitable or desired manner of substantially rigid material to include convenient means, such as a depending integral boss 11 having a threaded stud 12, for mounting attachment of the shell assembly to an automotive vehicle, or like support, in the path of relative air whereof the speed is to be determined. The shell 10 is preferably streamlined to such form as will minimize disturbance of its surrounding air stream, is formed with a closed lesser end and an open greater end, and is operatively mountable with its open end directed into the stream of relatively-moving air with its longitudinal axis parallel with the air stream. A screen, grid, grille, or the like, indicated as a sheet 13 of foraminous material, is disposed transversely across the open end of the casing 10 to protect the interior of said casing against the entrance of insects, foreign material, and undue amounts of moisture and dust, while permitting air flow through said open end and to the interior of the casing. To facilitate cleaning of the foraminous sheet 13 and access to the interior of the casing 10, the nose portion of the casing carrying said sheet may be removably associated with the adjacent portion of the casing assembly, as shown, or said screen may be otherwise removably mounted in the desired relation with the casing.

For convenience of assembly and to facilitate mounting of the pressure-responsive element, the casing 10 is preferably formed of two cooperating portions 10′ and 10″, separable on a transverse plane intersecting the casing at its point of maximum diameter, adjacent margins of said separable portions interengaging in any suitable or desired manner, as by means of coacting threads, to smoothly complete the assembly. The pressure-responsive element of the apparatus is a circular sheet or disc 14 of highly resilient material, such as rubber, having a diameter equal to or slightly in excess of the maximum interior diameter of the casing assembly 10, which disc 14 is mounted transversely of and in obstructing relation across said casing at the plane of maximum casing diameter. Various specific means and arrangements may be employed to mount the disc 14 in the desired relation within the casing 10 and with the outer margin of said disc sealed to and firmly held against the casing walls, one such mounting being illustrated as comprising a channeled ring 15 of substantially non-resilient material clamped over and in firmly gripping relation with the periphery of said disc, which ring 15 is adapted to seat in an annular recess formed between the cooperating margins of the casing portions 10' and 10" and be firmly clamped therebetween. The portion 10" of the casing assembly is open to the exterior atmosphere through a hole or bore traversing the boss 11 and stud 12 for purposes which will hereinafter appear, and may be additionally vented, as at 16, to insure that only atmospheric pressures are present in the otherwise closed portion of the casing assembly, and the casing portion 10' is preferably vented or apertured in its lowermost portion adjacent the disc 14, as indicated at 17, to permit free drainage of the moisture which might collect in such portion of the casing. With the construction and arrangement of elements thus far described, it is obvious that moving air entering through the sheet 13 to the portion 10' of the casing assembly will be productive of a pressure greater than atmospheric which will act on the disc 14 and move the central portion of said disc rearwardly from its normal position a distance proportional to the increased pressure which is a function of the air speed, the resilient character of the disc 14 permitting such rearward displacement of its central portion while its margin is fixedly held to the casing assembly. In Figures 1 and 2 the disc 14 is shown in full lines in a position it would occupy when acted upon by air having a relatively considerable velocity, while in Figure 3 the disc is shown in its normal position and free from the effect of relatively-moving air.

The longitudinal deflection of the disc 14 under the action of relatively-moving air may be utilized to measure the pressure and consequently the speed of such air, various arrangements of means being available to measure such deflection in terms of air speed, the means illustrated for such purpose in Figures 1 and 2 of the drawing being particularly desirable because of positive and efficient operation, simplicity, and availability for indication at a point remote from the pressure head. As shown in said Figures 1 and 2, a rigid stem 18 is adjustably fixed at one end to the midportion of the disc 14 and extends rearwardly therefrom and longitudinally of the casing 10 in substantial coincidence with the casing axis to fixed attachment with a block 19 of dielectric material, which block supports a pair of oppositely-disposed, upwardly and laterally diverging contact members 20 thus positioned and disposed for sliding engagement and electrical contact with resistance coil units 21 supported, by means of suitable brackets 22 engaging in fixed relation between said coils and an adjacent portion of the casing 10, in spaced parallelism with and on opposite sides of the longitudinal axis of the casing assembly. The contact members 20 are thus caused to move along adjacent portions of the coil units 21 as the midportion of the disc 14 fluctuates longitudinally of the casing assembly under the influence of the air pressure acting thereon, said contact members riding on and extending somewhat over upper portions of the coil units 21 to support the block 19 while the weight of the latter acts to insure an adequate contact between said contact members and coil units.

The operative length of the stem 18 may be adjusted at the point of stem attachment with the disc 14 so as to position the contact members 20 at one end of, and perhaps just out of engagement with, the initial windings of the coil units 21 when the disc 14 is in its normal or undeflected position, deflection of said disc 14 then acting to move said contact members across successive windings of the coil units to bring into circuit a number of such windings proportional to the amount of disc deflection. The contact members 20 and coil units 21 are included in an electrical circuit which leads from a source of electrical energy, such as a storage or secondary battery 23 through an electric indicator or meter 24 of a type operable to measure current flow and which is calibrated to indicate the current flow as controlled through the resistance coils 21 in terms of air speed or velocity, such as miles per hour. The coils 21 are resistance windings, and may be variously connected, as shown in Figures 5 and 6, for inclusion in an operative circuit 25, as above set forth, the showing of Figure 5 illustrating an arrangement wherein the units 21 are connected in series in the circuit 25, which latter is completed by means of an electrical bridge or connection between the contact members 20, while Figure 6 shows an arrangement wherein the coil units 21 are connected in parallel in the circuit 25 while a lead to complete said circuit is taken from the bridge or connection between the contact members 20. The indicator 24 is an electric meter of conventional type and in itself presents no novelty of construction or operation apart from its combination with the other elements of the invention, since it differs from standard instruments of its type only in its calibration chart whereon the normal electrical readings are replaced by air speed designations.

The alternative construction illustrated by Figure 3 contemplates adaptation of the operative principle hereabove described through mechanical rather than electrical means to provide a direct air-speed reading at the pressure head. In the construction shown, the stem 18 is extended rearwardly of the casing 10 in the form of a rack bar 18' which is adapted to operatively mesh with a pinion 26 in fixed relation with a rotatable drum 27 suitably journaled within and adjacent the closed end of the casing 10, which latter is modified in curvature to accommodate said drum and is provided with a transparent window, sight aperture, or the like, 28, disposed to overlie the periphery of the drum 27 and wherethrough air speed indicia on said drum periphery may be read, it being obvious that rearward deflection of the disc 14 will act through the stem 18, rack bar 18', and pinion 26, to rotate the drum 27 and expose indicia through the window 28 which, when properly calibrated, may accurately reflect the pressure and consequently the air speed acting upon the forward surfaces of said disc. Since this modified construction should be positioned for convenient observation of the window 28 when the open end of its casing is directed into an air stream, the form of mounting or attaching means illustrated in Figure 1 may not be effective for the mounting of the modified construction, and an ear or lug 29 rising in fixed relation from an upper portion of the casing 10 may be more suitable for mounting purposes.

Since many changes, variations, and modifications in the specific form, construction, and arrangement of the elements shown and described may be had without departing from the spirit of my invention, I wish to be understood as being limited solely by the scope of the appended claims, rather than by any details of the illustrative showing and foregoing description.

I claim as my invention—

1. Air-speed measuring and indicating means comprising a two-part, streamlined, hollow casing separable on a transverse plane intersecting its zone of maximum diameter, formed with one open and one closed end and adapted to be disposed with its open end directed into the air stream to be measured, a resilient diaphragm clamped transversely across the interior of said casing between the separable parts thereof for deflection rearwardly of the casing under pressures acting through the open end of said casing, and means associated with said diaphragm for visually indicating the amount of diaphragm deflection in terms of air speed.

2. Air-speed measuring and indicating means comprising a two-part, streamlined, hollow casing separable on a transverse plane intersecting its zone of maximum diameter, formed with one open and one closed end and adapted to be exposed with its open end directed into the air stream to be measured, a resilient diaphragm marginally clamped in traversing relation across the interior of said casing between the separable parts thereof and hence disposed for deflection of its central portion rearwardly of the casing under the influence of air pressures entering the open end of said casing, a stem adjustably fixed at one end to the midportion of said diaphragm and extending longitudinally and rearwardly of said casing, and means operable by said stem for the visual indication of the diaphragm deflection in terms of air speed.

3. Air-speed measuring and indicating means comprising a two-parts streamlined, hollow casing separable on a transverse plane intersecting its zone of maximum diameter, formed with one open and one closed end and adapted to be disposed with its open end directed into the air stream to be measured, a sheet of foraminous material traversing the open end of said casing to protect against the entrance of foreign matter, a resilient diaphragm marginally clamped transversely of said casing between separable parts thereof in spaced, parallel relation with and rearwardly of said casing from said foraminous sheet, said diaphragm being thus disposed for deflection of its central portion rearwardly of the casing under the influence of air pressures entering said casing through said sheet, and means engaging the central portion of said diaphragm and operable to visually indicate the deflection thereof in terms of air speed.

4. Air-speed measuring and indicating means comprising a two-part, stream-lined, hollow casing separable on a transverse plane intersecting its zone of maximum diameter, formed with one open and one closed end and adapted to be disposed with its open end directed into the air stream to be measured, a resilient diaphragm marginally clamped in transverse relation with the interior of the casing between the separable parts thereof at the point of maximum casing diameter and thus disposed for deflection of its central portion rearwardly of the casing under the influence of air pressures entering through the open end of the casing, a stem adjustably fixed at one end to the midportion of said diaphragm and extending longitudinally and rearwardly of the casing therefrom, resistance coil elements fixed longitudinally within said casing, adjacent the free end of said stem, contact members fixed to the free end of said stem in position to longitudinally traverse said coil elements, an electrical circuit including said coil elements and contact members, and a visual type electric meter calibrated in terms of air speed included in said circuit to register the current flow through said circuit as controlled and proportioned by the deflection of said diaphragm.

5. In air-speed measuring and indicating apparatus, an elongated, streamlined, hollow casing formed with one open and one closed end and of cooperating portions separable on a transverse plane at the point of maximum casing diameter, a resiliently-yieldable diaphragm marginally clamped between said separable casing portions transversely of the casing interior and thus disposed for deflection of its central portion rearwardly of the casing under the influence of air pressures acting through the open casing end, and means operatively associated with said diaphragm for visually indicating deflection thereof in terms of air speed.

6. In air-speed measuring and indicating apparatus, an elongated, streamlined, hollow casing formed with one open and one closed end and of cooperating portions separable at the point of maximum casing diameter, a foraminous, protective sheet traversing the open end of said casing, a resiliently-yieldable diaphragm marginally clamped between said casing portions in transverse relation with said casing and thus mounted for deflection of its central portion rearwardly of the casing under the influence of pressures acting through the open casing end, a stem adjustably-fixed to the midportion of said diaphragm and extending rearwardly and longitudinally of said casing, and means actuable by the free end of said stem in proportion to and as an incident of rearward diaphragm deflection to visually indicate the amount of such deflection in terms of air speed.

JOSEPH P. HEAGNEY.